United States Patent

Ishii et al.

(10) Patent No.: US 10,854,221 B2
(45) Date of Patent: Dec. 1, 2020

(54) AUDIO DEVICE INCLUDING NON-CONTACT POWER FEEDING MECHANISM

(71) Applicant: YAMAHA CORPORATION, Hamamatsu (JP)

(72) Inventors: Jun Ishii, Hamamatsu (JP); Shinya Mizoshiri, Hamamatsu (JP); Hisashi Nagai, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 16/690,168

(22) Filed: Nov. 21, 2019

(65) Prior Publication Data

US 2020/0168243 A1 May 28, 2020

(30) Foreign Application Priority Data

Nov. 22, 2018 (JP) .................................. 2018-219435

(51) Int. Cl.

| G11B 3/60 | (2006.01) |
|---|---|
| H02J 50/10 | (2016.01) |
| H04R 25/00 | (2006.01) |
| G11B 3/61 | (2006.01) |
| H04B 1/20 | (2006.01) |
| G11B 31/00 | (2006.01) |
| H04H 60/04 | (2008.01) |

(52) U.S. Cl.
CPC ................ *G11B 3/60* (2013.01); *H02J 50/10* (2016.02); *G11B 3/61* (2013.01); *G11B 31/00* (2013.01); *H04B 1/20* (2013.01); *H04H 60/04* (2013.01); *H04R 25/43* (2013.01); *H04R 2420/01* (2013.01)

(58) Field of Classification Search
None
See application file for complete search history.

(56) References Cited

U.S. PATENT DOCUMENTS

| 3,909,643 | A | * | 9/1975 | Kishima | ............ | G11B 19/2009 |
|---|---|---|---|---|---|---|
| | | | | | | 310/68 R |
| 4,131,828 | A | * | 12/1978 | Houshi | .............. | G11B 19/2009 |
| | | | | | | 318/400.2 |
| 4,194,743 | A | * | 3/1980 | Ohsawa | ............... | G11B 19/022 |
| | | | | | | 310/268 |
| 6,373,799 | B1 | * | 4/2002 | Ono | ................... | G06K 7/10336 |
| | | | | | | 369/100 |
| 2003/0165100 | A1 | | 9/2003 | Kikuchi | | |

(Continued)

FOREIGN PATENT DOCUMENTS

JP        2003257171 A        9/2003

*Primary Examiner* — Tan X Dinh
(74) *Attorney, Agent, or Firm* — Rossi, Kimms & McDowell LLP

(57) ABSTRACT

An audio device includes a base portion a power supply circuit arranged on the base portion and configured to output electric power; a rotation body rotatably supported by the base portion and configured to, upon rotation of the rotation body, move a playback point of a piece of music; an electric circuit arranged on the rotation body; and a non-contact power feeding mechanism configured to supply in a non-contact manner the electric power output by the power supply circuit to the electric circuit in which the non-contact power feeding mechanism is arranged on a path from the power supply circuit to the electric circuit.

10 Claims, 4 Drawing Sheets

(56) References Cited

U.S. PATENT DOCUMENTS

| | | | | |
|---|---|---|---|---|
| 2004/0085865 A1* | 5/2004 | Kataoka | ............... | G10H 1/34 |
| | | | | 369/30.36 |
| 2006/0039245 A1* | 2/2006 | Huang | ............... | G11B 19/00 |
| | | | | 369/18 |
| 2006/0221776 A1* | 10/2006 | Roman | ............... | H04H 60/04 |
| | | | | 369/1 |
| 2019/0013040 A1* | 1/2019 | Tanishima | ............... | G11B 3/60 |
| 2019/0384564 A1* | 12/2019 | Nagai | ............... | G08C 17/02 |

* cited by examiner

AUDIO DEVICE INCLUDING NON-CONTACT POWER FEEDING MECHANISM

CROSS REFERENCE TO RELATED APPLICATIONS

This application is based on and claims priority from Japanese Patent Application No. 2018-219435, filed Nov. 22, 2018, the entire contents of which are incorporated herein by reference.

TECHNICAL FIELD

The present disclosure relates to a technology for playing sounds.

BACKGROUND

Various technologies for playing sounds have been proposed in conventional arts. For example, Japanese Patent Application Laid-Open Publication No. 2003-257171 (hereafter, JP 2003-257171) discloses a playback device that plays music recorded on a disk placed on a rotating turntable.

A configuration is assumed in which various electric circuits are mounted on a turntable. In the technology described in JP 2003-257171 a configuration is used that supplies electric power to the various electric circuits mounted on the turntable via wired connections such as power cables. This configuration suffers from a drawback, however, in that the use of power cables disturbs rotation of the turntable.

Assumed also is a configuration whereby electric power is supplied to electric circuits mounted on a turntable by use of a commutator and a brush. However, this configuration also suffers from a drawback in that wear of the commutator over time and noise generated by sliding between the commutator and the brush occur.

Taking into account the above circumstances, an object of the present disclosure is to supply power to electric circuits mounted on a turntable without disturbing rotation of the turntable, while at the same time suppressing wear and noise.

SUMMARY

To achieve the stated object, an audio device according to an aspect of the present disclosure includes a base portion; a power supply circuit arranged on the base portion and configured to output electric power; a rotation body rotatably supported by the base portion and configured to, upon rotation of the rotation body, move a playback point of a piece of music; an electric circuit arranged on the rotation body; and a non-contact power feeding mechanism configured to supply in a non-contact manner the electric power output by the power supply circuit to the electric circuit, and the non-contact power feeding mechanism is arranged on a path from the power supply circuit to the electric circuit.

DESCRIPTION OF THE EMBODIMENTS

First Embodiment

Figure 1:
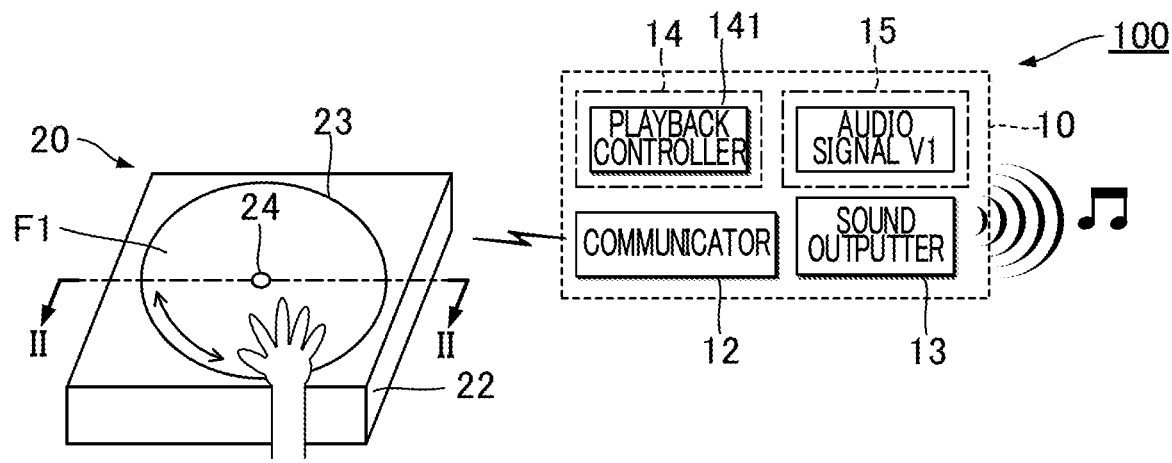
FIG. 1 is a diagram illustrating a configuration of a playback system according to a first embodiment.

FIG. 1 is a diagram illustrating a configuration of a playback system 100 according to a first embodiment of the present disclosure. The playback system 100 of the first embodiment is, for example, a computer system that plays a piece of music, and is installed at a variety of event venues such as clubs or live houses. A user of the playback system 100 is, for example, a disc jockey (DJ). As shown in FIG. 1, the playback system 100 according to the first embodiment includes a control system 10 and a DJ device 20.

The control system 10 controls playback of a piece of music. The control system 10 of the first embodiment also functions as a playback device that plays a piece of music. For example, a portable information terminal, such as a smartphone, a tablet terminal, or a personal computer, may be used as the control system 10. Playback of a piece of music is caused to start or stop in accordance with an operation made by a user to an operation device (not shown). The operation device (for example, a touch panel) is configured to include operators that are operated, for example, by the user. The control system 10 and the DJ device 20 are communicable with each other by use of short-range wireless communication such as Bluetooth (registered trademark) or Wi-Fi (registered trademark).

The DJ device 20 of the first embodiment is a manipulation device (a so-called "DJ controller") that is manipulated by the user to change a time point (hereafter, a "playback point") to be played on a time axis of a piece of music played by the control system 10.

As shown in FIG. 1, the DJ device 20 includes a casing 22 and a turntable 23. The casing 22 is a hollow structure in the form of a cuboid. As shown in FIG. 1, the turntable 23 is installed on an upper surface of the casing 22. The turntable 23 of the first embodiment is a manipulator used for controlling playback of a piece of music. The user while in contact with the turntable 23 manipulates the turntable to change a playback point. For use as the turntable 23 is a disk that rotates in accordance with the manipulation made by the user. Accordingly, DJ play, such as scratching, can be performed. As shown in FIG. 1, the turntable 23 rotates around a rotation shaft 24 installed at the center of the turntable 23. The turntable 23 is rotatable in both a right (clockwise) direction and a left (counterclockwise) direction.

To change the playback point, the user while in contact with the turntable 23 may rotate the turntable in either direction and at any speed. A manipulation to change the playback point (namely, DJ play) can be made at any time point on the time axis of a piece of music. Specifically, the manipulation for rotating the turntable 23 clockwise corresponds to a manipulation (for example, fast forwarding) for moving the playback point forward on the time axis (forward direction), and a manipulation for rotating the turntable 23 counterclockwise corresponds to a manipulation (for example, fast rewinding) for moving the playback point backward on the time axis (reverse direction).

The control system 10 of the first embodiment changes the playback point of a piece of music in accordance with the manipulation made by the user to the DJ device 20. As shown in FIG. 1, the control system 10 includes a communicator 12, a sound outputter 13, a controller 14, and a storage device 15. The storage device 15 stores a computer program for execution by the controller 14, and a variety of data (for example, an audio signal V1) for use by the controller 14. The audio signal V1 is a signal representative of musical performance sounds of the piece of music, and consists of a series of samples. The file format of the audio signal V1 may be of any known format. A known recording medium such as a semiconductor recording medium may be freely adopted for use as the storage device 15. A recording medium externally detachable from the control system 10 may be used as the storage device 15. The communicator 12 is used for communication with the DJ device 20.

The controller 14 executes a computer program stored in the storage device 15 to realize a function (a playback controller 141) for controlling playback of a piece of music. It is of note that a configuration may be adopted by which some of the functions of the controller 14 are realized by use of dedicated electronic circuitry, or a configuration by which the functions of the controller 14 are distributed among a plurality of devices.

The playback controller 141 supplies to the sound outputter 13 a series of samples (hereafter, an "audio signal V2") of the audio signals V1 stored in the storage device 15. The audio signal V2 corresponds to a playback point. Since the playback point is set in accordance with the manipulation made to the turntable 23, the audio signal V2 is generated from the audio signal V1 in accordance with the manipulation made to the turntable 23. Accordingly, a playback sound that accords with the manipulation made to the DJ device 20 is played. Specifically, the playback direction (that is, the forward direction or the reverse direction) and the playback speed of a piece of music each change depending on the manipulation made to the DJ device 20. When no manipulation is made to the turntable 23, the playback point progresses in the forward direction at a constant speed. The audio signal V2 thus has the same waveform as the audio signal V1, and is supplied to the sound outputter 13.

The sound outputter 13 is, for example, a speaker or a headphone, and reproduces a piece of music in accordance with the audio signal V2 (that is, a signal representative of musical performance sounds of the piece of music) supplied from the playback controller 141. That is, the sound outputter 13 emits sound waves through air causing the air to vibrate and music to be reproduced in accordance with the emitted sound waves. It is of note that a sound outputter 13 externally attached to the control system 10 or a sound outputter 13 communicable with the control system 10 may be used for playback of a piece of music. In other words, the sound outputter 13 and the control system 10 may be separate or integrated.

Figure 2:
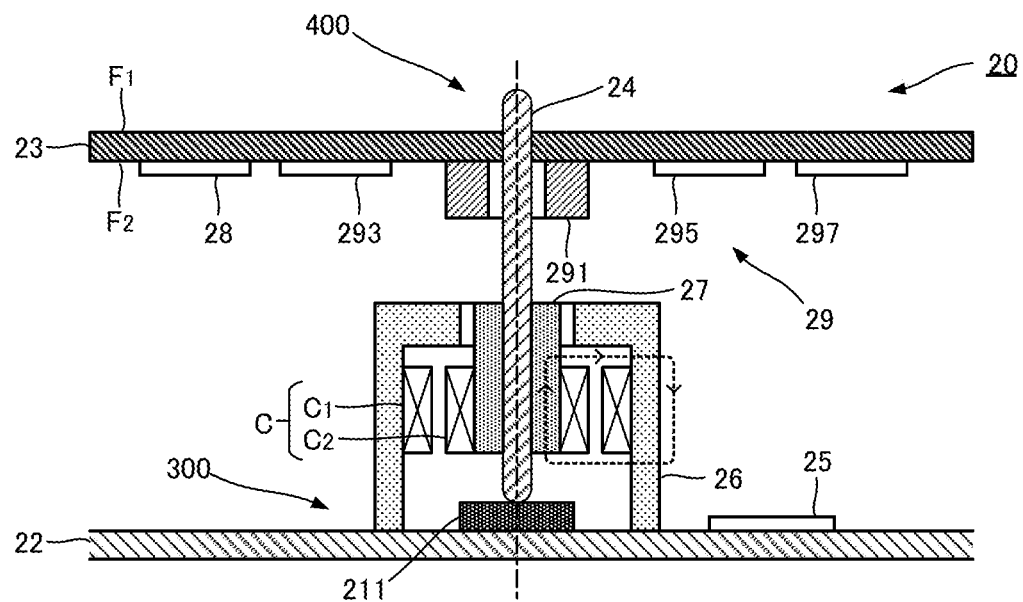
FIG. 2 is a cross-sectional view of a DJ device shown in FIG. 1.

FIG. 2 is a cross-sectional view taken along a line II-II of the DJ device 20 shown in FIG. 1. As shown in FIG. 2, one end of the rotation shaft 24 is fixed to the center of the turntable 23, and the other end thereof is rotatably supported by the casing 22. An iron core is, for example, suitable for use as the rotation shaft 24. It is of note that a shock absorber (cushion) 211 to reduce an impact due to collision of the rotation shaft 24 is arranged between the rotation shaft 24 and the casing 22. As shown in FIG. 2, the turntable 23 includes a manipulation surface F1, with which the user is in contact during manipulation of the turntable 23 by the user, and a mounting surface F2 on the side opposing the manipulation surface F1.

As shown in FIG. 2, a power supply circuit 25, a non-contact power feeder (non-contact power feeding mechanism) C, a first supporter 26, a second supporter 27, a power supply processing circuit 28, and an electric circuit 29 are accommodated in the casing 22. The power supply circuit 25 is arranged in the casing 22, and the power supply processing circuit 28 and the electric circuit 29 are arranged on the mounting surface F2 of a rotating portion. The power supply circuit 25 outputs AC power corresponding to DC power supplied from an external power supply. The non-contact power feeder C supplies in a non-contact manner electric power output from the power supply circuit 25 to the power supply processing circuit 28. The electric power processed by the power supply processing circuit 28 is supplied to the electric circuit 29. In other words, the electric power output by the power supply circuit 25 is supplied in a non-contact manner to the electric circuit 29 via the non-contact power feeder C.

The non-contact power feeder C of the first embodiment is a transformer that includes a first coil C1 and a second coil C2. The first coil C1 is a power transmission coil that transmits the electric power output by the power supply circuit 25 to the second coil C2. The second coil C2 is a power reception coil that receives the electric power transmitted from the first coil C1. The first coil C1 is supported by the first supporter 26 and the second coil C2 is supported by the second supporter 27. The second supporter 27 is a cylindrical structure and is arranged on the rotation shaft 24. The second supporter 27 is arranged such that the rotation shaft 24 passes in its entirety through the second supporter 27. As shown in FIG. 2, the second coil C2 is wound around an outer periphery of the second supporter 27. When the user manipulates the turntable 23, the rotation shaft 24, the second supporter 27, and the second coil C2 rotate in conjunction with the turntable 23.

The first supporter 26 is a cylindrical structure and is arranged in the casing 22. The first supporter 26 is arranged in the casing 22 such that a portion of the rotation shaft 24 around which the second coil C2 is wound is accommodated in an inner space of the first supporter 26. As shown in FIG. 2, the first coil C1 is wound around an inner wall surface of the first supporter 26. In other words, the second coil C2 is located at an inner side of the first coil C1. An inner periphery of the first coil C1 and an outer periphery of the second coil C2 are arranged apart from and in opposing relation to each other. Thus, the first coil C1 and the second coil C2 are not in contact with each other. The second coil C2 rotates at the inner side of the first coil C1 when manipulation of the turntable 23 is made by the user. The first supporter 26 and the second supporter 27 are made of a magnetic material, and a magnetic field is generated as indicated by the broken line arrow in FIG. 2.

In the first embodiment, the casing 22 and the first supporter 26 together serve as a base portion 300. Further, the turntable 23, the rotation shaft 24, and the second supporter 27 are supported rotatably by the base portion 300 and together serve as a rotation body 400 that upon rotation moves a playback point of a piece of music. The base portion 300 remains fixed regardless of the manipulation of the turntable 23 by the user. The rotation body 400 rotates in accordance with the manipulation of the turntable 23 by the user. The first coil C1 is arranged on the base portion 300

(the first supporter 26) and the second coil C2 is arranged on and to be movable with the rotation body 400 (the second supporter 27).

Figure 3:
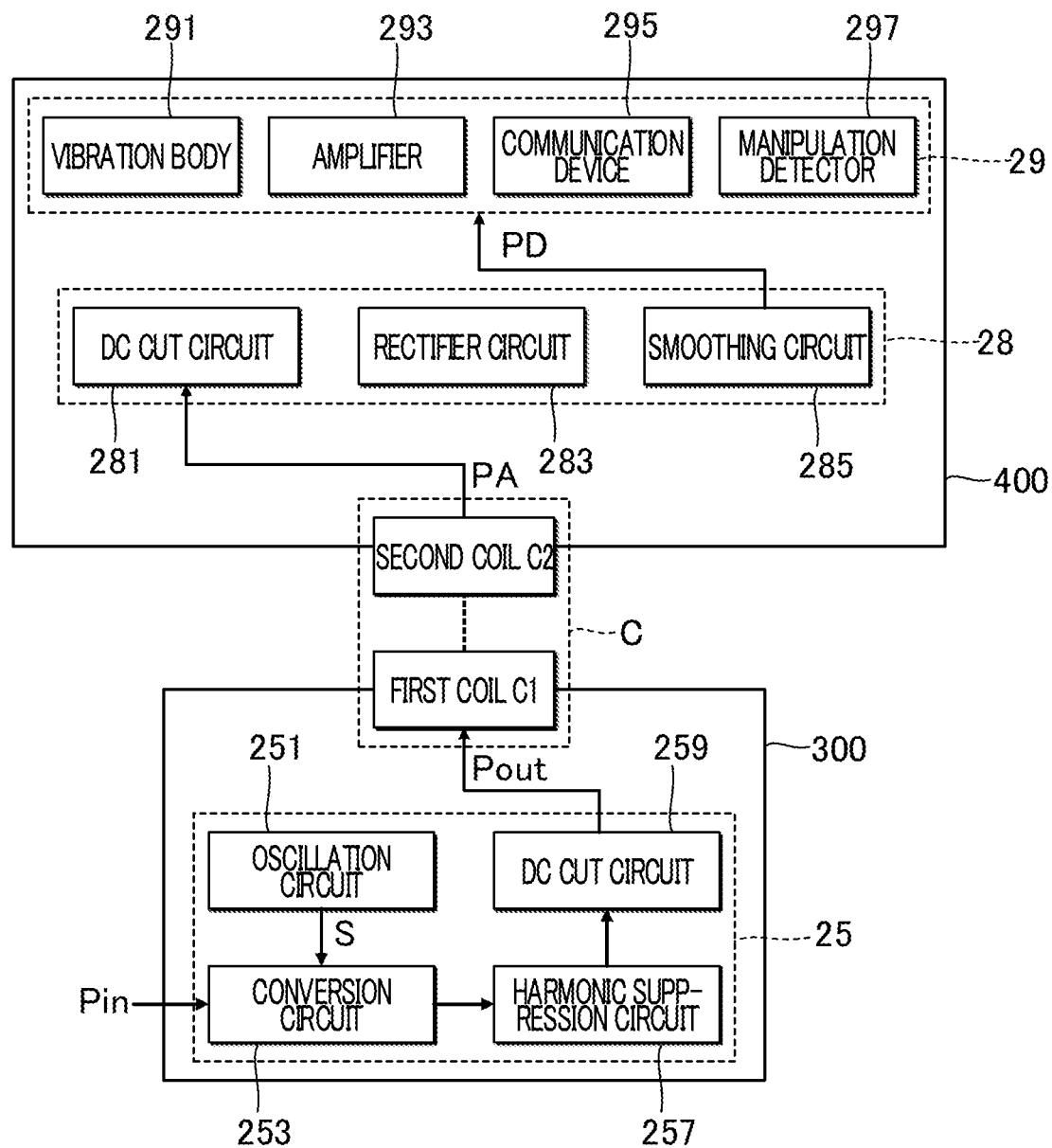
FIG. 3 is a block diagram illustrating a functional configuration of the DJ device.

FIG. 3 is a block diagram illustrating a functional configuration of the DJ device 20. The AC power Pout output by the power supply circuit 25 installed at the base portion 300 (the casing 22) is supplied to the electric circuit 29 connected to the rotation body 400 (the turntable 23) via the non-contact power feeder C. As shown in FIG. 3, the power supply circuit 25 includes an oscillation circuit 251, a conversion circuit 253, a harmonic suppression circuit 257, and a DC cut circuit 259.

The oscillation circuit 251 generates a periodic signal S that varies with a predetermined oscillation frequency. The periodic signal S is a clock signal that varies, for example, with an oscillation frequency that has a high power transmission efficiency. The conversion circuit 253 is a DC-AC conversion circuit that converts DC power Pin supplied from the external power supply into AC power by use of the periodic signal S generated by the oscillation circuit 251. A half-bridge circuit or a full-bridge circuit including transistors that are turned on/off in a complementary manner depending on the periodic signal S are examples of the conversion circuit 253. The harmonic suppression circuit 257 is a low-pass filter that suppresses harmonic components exceeding a predetermined frequency of the AC power, which is output by the conversion circuit 253. The DC cut circuit 259 is configured to include a capacitor of, for example, a sufficiently low impedance relative to the oscillation frequency described above, thereby to generate the electric power (alternating current) Pout by suppressing the DC components from the output electric power of the harmonic suppression circuit 257. The power Pout generated by the DC cut circuit 259 is supplied to the first coil C1 of the non-contact power feeder C.

When the power Pout is supplied to the first coil C1, AC power PA is generated in the second coil C2 as a result of mutual induction. The AC power PA generated in the second coil C2 is supplied to the power supply processing circuit 28 arranged on the turntable 23. The power supply processing circuit 28 may be arranged on an element different from the turntable 23, of the rotation body 400. The power supply processing circuit 28 converts the AC power PA into DC power PD and supplies the DC power PD to the electric circuit 29. As shown in FIG. 3, the power supply processing circuit 28 includes a DC cut circuit 281, a rectifier circuit 283, and a smoothing circuit 285. The DC cut circuit 281 suppresses DC components in the AC power PA supplied from the second coil C2. The rectifier circuit 283 rectifies the AC power output from the DC cut circuit 281 (half-wave rectification or full-wave rectification). The smoothing circuit 285 is configured to include, for example, a capacitor having a large capacity, and generates the DC power PD by smoothing the power after rectification by the rectifier circuit 283. The DC power PD generated by the smoothing circuit 285 is supplied to the electric circuit 29.

The electric circuit 29 is driven by the DC power PD supplied from the power supply processing circuit 28. As shown in FIG. 3, the electric circuit 29 includes a vibration body 291, an amplifier 293, a communication device 295, and a manipulation detector 297. The DC power PD is supplied to each of the vibration body 291, the amplifier 293, the communication device 295, and the manipulation detector 297. The manipulation detector 297 detects a manipulation performed onto the turntable 23 and generates manipulation information in accordance with the detected manipulation. The manipulation detector 297 may be a rotary encoder for optically detecting rotation, or a sensor that detects rotation by measuring changes in resistance at an electrical contact. The manipulation detector 297 generates manipulation information including an amount of rotation and a rotation direction of the turntable 23 at a predetermined period, for example. The manipulation information is used for setting the playback point (that is, generation of the audio signal V2) by the control system 10. It is of note that any known technology may be appropriately adopted for generation of the manipulation information.

The communication device 295 is used for communication with the control system 10. Specifically, the communication device 295 transmits the manipulation information generated by the manipulation detector 297 to the control system 10. The control system 10 generates the audio signal V2 in accordance with the manipulation information transmitted from the DJ device 20, and transmits the audio signal V2 to the DJ device 20. The communication device 295 receives the audio signal V2 generated by the control system 10.

The amplifier 293 amplifies the audio signal V2 transmitted from the control system 10 and supplies the amplified audio signal V2 to the vibration body 291. The vibration body 291 vibrates in accordance with the audio signal V2 amplified by the amplifier 293 (namely, in accordance with the audio signal V2 received by the communication device 295). As shown in FIG. 2, the vibration body 291 is arranged on the mounting surface F2 of the turntable 23. In some embodiments, an actuator such as an eccentric motor, a linear vibrator, or a piezoelectric element may be used as the vibration body 291. The turntable 23, on which the vibration body 291 is installed, vibrates in conjunction with vibration of the vibration body 291. As a result, the user manipulating the turntable 23 while in contact therewith is able to feel vibration that accords with a playback point of a piece of music. As will be understood from the foregoing description, the user can sense the sound represented by the playback point not only aurally from the sound output by the sound outputter 13 but can sense the sound also tactually.

In a configuration in which electric power is supplied to the electric circuit 29 on the rotation body 400 via a wired connection such as a power cable, the power cable disturbs the rotation of the rotation body 400. Further, there is also assumed a configuration in which electric power is supplied to the electric circuit 29 provided on the rotation body 400 by use of a commutator and a brush. However, wear of the commutator over time, and noise generated by sliding between the commutator and the brush are problematic. According to the configuration of the first embodiment, the electric power output by the power supply circuit 25 arranged on the base portion 300 that supports the rotation body 400 is supplied to the electric circuit 29 arranged on the rotation body 400 in a non-contact manner, and thus electric power can be supplied to the electric circuit 29 on the rotation body 400 without disturbing the rotation thereof, while suppressing both wear and noise.

Second Embodiment

A second embodiment of the present disclosure will now be described. Elements of actions or functions that are the same as those of the first embodiment in each of the embodiments illustrated below are denoted by like reference numerals used in the description of the first embodiment, and detailed description thereof is omitted as appropriate.

In the second embodiment, there is assumed a DJ device 20 in which a record R (i.e., an analog record) is placed on the turntable 23. An audio signal (the audio signal V1) of a piece of music is recorded on the record R. That is, a record player is used as the DJ device 20.

Figure 4:
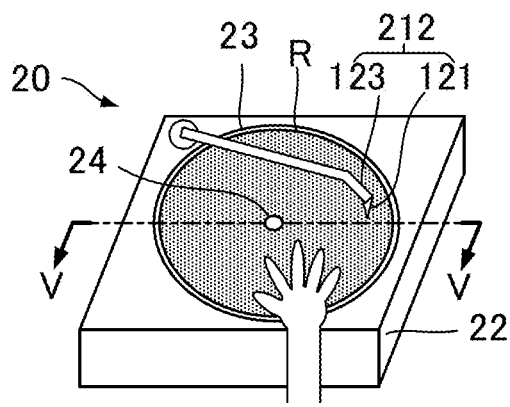
FIG. 4 is a perspective view illustrating a configuration of the DJ device according to a second embodiment.

FIG. 4 is a perspective view illustrating a configuration of the DJ device 20 according to the second embodiment. As shown in FIG. 4, the DJ device 20 includes a detection device 212 that generates an audio signal V2 corresponding to the audio signal V1 recorded on the record R. The detection device 212 is arranged on an upper surface of the casing 22, and includes, for example, a record needle 121 and a tone arm 123. A groove portion representing the audio signal V1 is formed in a spiral shape on the record R. A portion at which the record needle 121 comes into contact with the groove portion on the record R is a playback point. As the audio signal V2 there is generated a series of portions corresponding to playback points of the audio signal V1.

Figure 5:
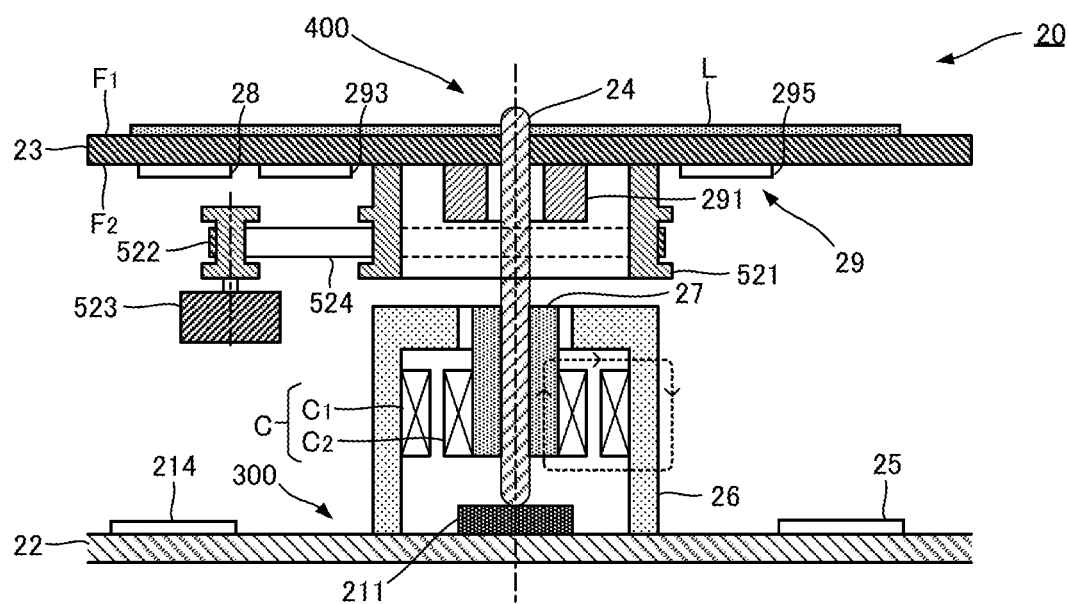
FIG. 5 is a cross-sectional view of the DJ device shown in FIG. 4.

FIG. 5 is a cross-sectional view taken along a line V-V of the DJ device 20 shown in FIG. 4. As shown in FIG. 5, the DJ device 20 of the second embodiment includes a drive mechanism that rotates the turntable 23 (that is, the rotation body 400). The drive mechanism includes a rotation body 521, a pulley 522, a motor 523, and an endless belt 524. The motor 523 rotates the pulley 522. The rotation body 521 is a cylindrical structure mounted to the back surface of the turntable 23. The endless belt 524 is arranged between the rotation body 521 and the pulley 522. By use of the above configuration, the rotation body 521 is caused to rotate in conjunction with the pulley 522 at a constant angular velocity.

In the second embodiment, a playback point changes in accordance with a manipulation made by a user to rotate the record R (that is, DJ play) while the user is in contact with the record R. That is, the record R rotates at a constant speed under the rotation of the turntable 23, and also rotates at a speed that accords with the manipulation made to the record R by the user. Thus, the audio signal V2 is output from the detection device 212 in accordance with the manipulation made by the user to the record R. It is of note that when no manipulation is made to the record R, the playback point progresses in the forward direction at a constant speed. In such a case, an audio signal V2 that has the same waveform as that of the audio signal V1 is detected by the detection device 212.

Figure 6:
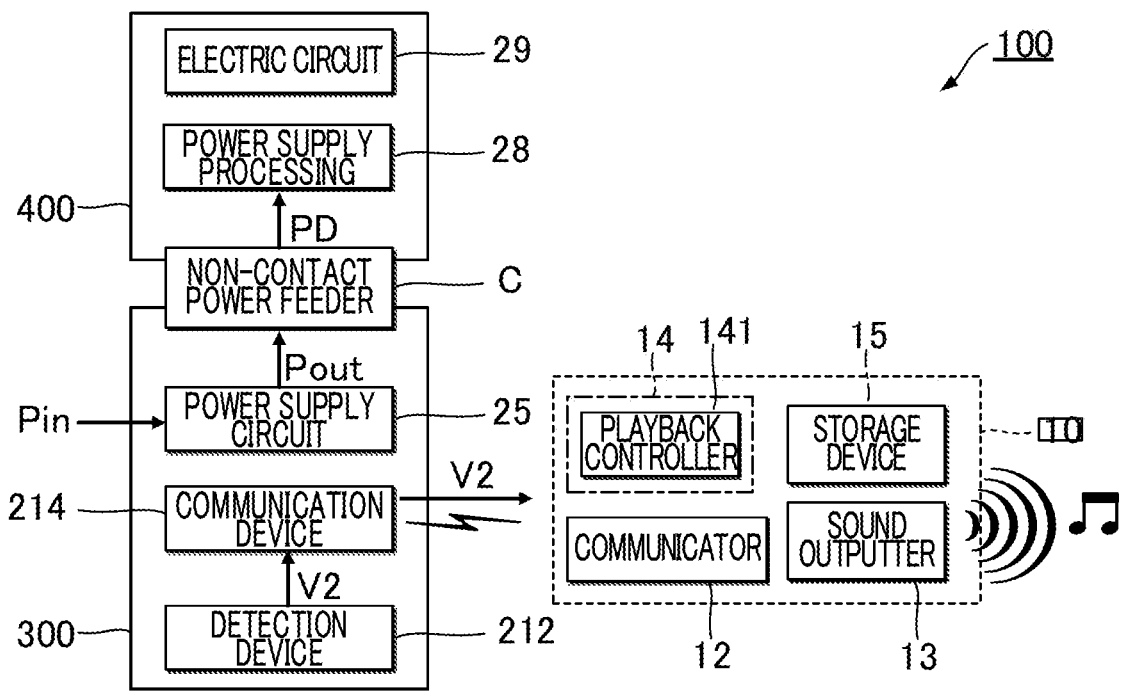
FIG. 6 is a block diagram illustrating a functional configuration of the DJ device.

FIG. 6 is a block diagram illustrating a functional configuration of the DJ device 20 according to the second embodiment. As shown in FIG. 5 and FIG. 6, the detection device 212 described above and a communication device 214 are arranged on the base portion 300 of the second embodiment, in addition to a power supply circuit 25 that is substantially the same as the power supply circuit of the first embodiment. The communication device 214 is used for communication with the control system 10 by use of, for example, short-range wireless communication. Specifically, the communication device 214 transmits the audio signal V2 generated by the detection device 212 to the control system 10. The playback controller 141 of the control system 10 according to the second embodiment supplies the audio signal V2 transmitted from the DJ device 20 to the sound outputter 13. The sound outputter 13 outputs the sound represented by the audio signal V2. That is, a playback sound is played that accords with a user manipulation made to the DJ device 20. The communicator 12 transmits the audio signal V2 received from the communication device 214 provided on the base portion 300 to the communication device 295 of the rotation body 400. Unlike the control system 10 of the first embodiment, the control system 10 of the second embodiment plays the audio signal V2 transmitted from the DJ device 20, and thus there is no necessity to store the audio signal V1 in the storage device 15.

The electric circuit 29 of the DJ device 20 according to the second embodiment is driven by electric power supplied via the non-contact power feeder C, as in the first embodiment. Unlike the first embodiment, the electric circuit 29 of the DJ device 20 according to the second embodiment does not include a manipulation detector 297. The communication device 295 of the electric circuit 29 receives the audio signal V2 transmitted from the control system 10, as in the first embodiment. The amplifier 293 amplifies the audio signal V2 received by the communication device 295, as in the first embodiment. The vibration body 291 vibrates in accordance with the audio signal V2 amplified by the amplifier 293 (that is, in accordance with the audio signal V2 received by the communication device 295). As will be understood from the foregoing description, in the second embodiment, the same effects as those of the first embodiment are realized. It is of note that in the second embodiment, the communication device 214 transmits the audio signal V2 to the control system 10, but the communication device 214 may transmit the audio signal V2 to the communication device 295. The vibration body 291 vibrates in accordance with the audio signal V2 received from the communication device 214 via the communication device 295.

Third Embodiment

Figure 7:
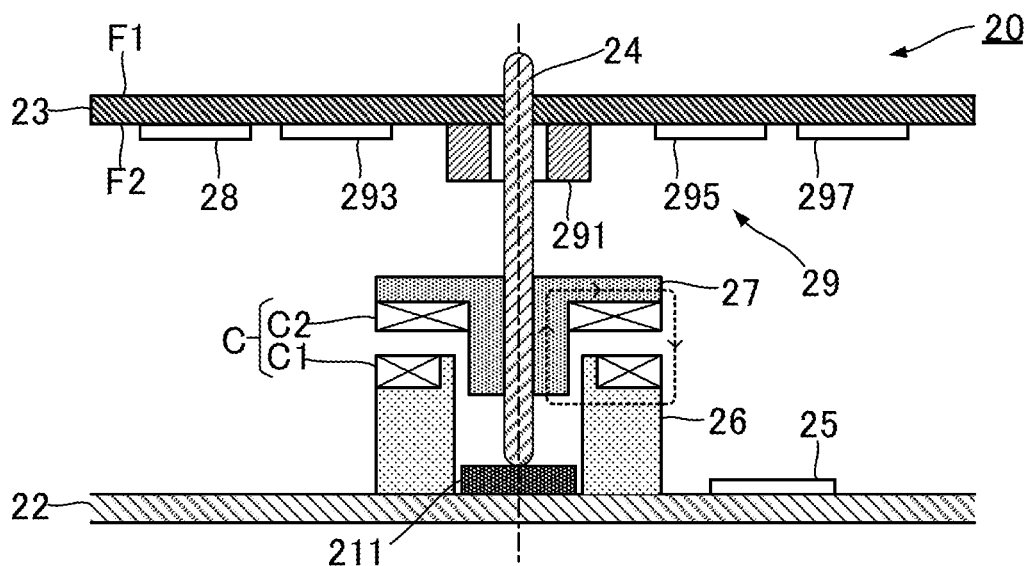
FIG. 7 is a cross-sectional view of a DJ device according to a third embodiment.

FIG. 7 is a cross-sectional view (a cross-sectional view corresponding to FIG. 2) of the DJ device 20 according to a third embodiment. In the first embodiment, a configuration in which the second coil C2 is located at an inner side of the first coil C1 is shown. In the third embodiment, a configuration in which the first coil C1 and the second coil C2 are located vertically along a direction of extension of the rotation shaft 24 is shown. The configuration of the third embodiment, with the exception of the non-contact power feeder C (the first coil C1 and the second coil C2) in the DJ device 20, is substantially the same as that of the first embodiment.

As shown in FIG. 7, the first coil C1 is supported by the first supporter 26 arranged in the casing 22 and the second coil C2 is supported by the second supporter 27 arranged on the rotation shaft 24. In other words, the first coil C1 is arranged on the base portion 300 and the second coil C2 is arranged on the rotation body 400. An upper surface of the first coil C1 and a lower surface of the second coil C2 are provided apart from and in opposing relation to each other. As in the first embodiment, since the first supporter 26 and the second supporter 27 are each formed of a magnetic body, a magnetic field is generated as indicated by a broken line arrow in FIG. 7.

As will be understood from the foregoing description, as in the first embodiment, the power Pout output from the power supply circuit 25 can be supplied to the electric circuit 29 in a non-contact manner. In the third embodiment, since the first coil C1 and the second coil C2 are located along the direction of extension of the rotation shaft 24, a thickness (height) of the casing 22 can be decreased as compared with that in the configuration of the first embodiment. In other words, a size of the DJ device 20 can be reduced (made thinner). According to the configuration in which the second coil C2 is located at an inner side of the first coil C1 as in the first embodiment, however, an advantage is obtained in that electric power can be more efficiently supplied from the base portion 300 to the rotation body 400. It is of note that the configuration of the third embodiment may be also applied to the second embodiment.

Modifications

Each of the embodiments set out above may be modified in a variety of ways. Specific modifications are described below. Two or more modes freely selected from among the following modifications may be appropriately combined so long as such combination does not give rise to any incongruence.

(1) The present disclosure is also applicable for use in devices other than the DJ device 20. For example, the present disclosure may be applied to a record player that is not intended to be manipulated by way of a turntable 23 or a record by a user. The DJ device 20 and the record player are comprehensively expressed as an audio device.

(2) In each of the embodiments described above, a configuration in which the electric circuit 29 includes the vibration body 291, which vibrates in accordance with the audio signal V2, is shown. However, the electric circuit 29 may include, for example, a light emitter that emits light in accordance with the audio signal V2. The vibration body 291 and the light emitter are comprehensively expressed as an action unit that operates in accordance with the audio signal V2. It is of note that a configuration in which the electric circuit 29 includes an action unit different from the vibration body 291 and the light emitter may also be adopted.

(3) In the first and the third embodiments, the manipulation detector 297 detects rotational manipulation made by a user to the turntable 23. However, the manipulation detector 297 may additionally detect touch manipulation, for example, tapping, made by the user to the turntable 23. In this case, the manipulation detector 297 generates manipulation information including touch information indicative of touch conditions. The touch information may include a touch intensity and/or a touch position of the touch manipulation. The action unit may then be controlled to operate in accordance with the touch information included in the manipulation information. For example, amplitudes of vibration of the vibration body 291 may be changed in accordance with the touch information. Also, light emitting patterns or colors of light at the light emitter may be changed in accordance with the touch information.

The touch information may also be used for generation of the audio signal V2 by the control system 10. For example, the volume of the audio signal V2 may be changed in accordance with touch information. In a configuration in which the control system 10 carries out effect-imparting-processing to impart audio effects to the audio signal V2, parameters for such audio effects may be controlled by the touch information. A playback point may be changed based on the touch information. For example, a current playback point may be changed to a predetermined time point when a user taps the turntable 23 during playback. In this way, the audio signal V2 is controlled in accordance with the touch information. It may be then stated that the action unit that operates in accordance with the audio signal V2 is controlled in accordance with the touch information.

(4) In the first and the third embodiments, the manipulation detector 297 is arranged on the rotation body 400 but may instead be arranged on the base portion 300. In this configuration, there is provided on the base portion 300 a transmitter for transmitting manipulation information generated by the manipulation detector 297 to the control system 10. The manipulation information transmitted via the transmitter to the control system 10 is used for generation of the audio signal V2 in the control system 10.

(5) In each of the embodiments described above, the audio signal V2 received wirelessly by the communication device 295 is supplied to the action unit. However, the non-contact power feeder C may be used for transmission of the audio signal V2. In this configuration, the non-contact power feeder C transmits the audio signal V2 from the base portion 300 to the action unit, and the action unit operates in accordance with the audio signal V2 transmitted from the non-contact power feeder C. The audio signal V2 is transmitted from the base portion 300 to the rotation body 400, for example, by being multiplexed with the power Pout. According to the configuration in which the non-contact power feeder C transmits the audio signal V2, the DJ device 20 of a reduced size can be provided, as compared with a configuration in which an element that transmits the audio signal V2 to the action unit (for example, the communication device 295) is prepared separately from the non-contact power feeder C. Nevertheless, according to the configuration in which the action unit operates in accordance with the audio signal V2 wirelessly received by the communication device 295, an advantage is obtained in that noise of the audio signal V2 is reduced, as compared with a configuration in which the non-contact power feeder C transmits the audio signal V2.

(6) In each of the embodiments described above, the electric circuit 29 is arranged on the mounting surface F2 of the turntable 23, but the position at which the electric circuit 29 is arranged is not limited to the mounting surface F2 of the turntable 23. The electric circuit 29 may be arranged at any position on the rotation body 400. For example, the electric circuit 29 may be arranged on the manipulation surface F1 of the turntable 23 or on the rotation shaft 24. It is of note that the respective elements of the electric circuit 29 (the vibration body 291, the amplifier 293, the communication device 294, and the manipulation detector 297) may be arranged at different positions of the rotation body 400. For example, the vibration body 291 may be arranged on the manipulation surface F1, and the other elements may be arranged on the mounting surface F2 of the turntable 23.

(7) In each of the embodiments described above, the first coil C1 is arranged on the first supporter 26, but the first coil C1 may be arranged at any position on the base portion 300. For example, the first coil C1 may be arranged on the casing 22. In other words, the first supporter 26 need not necessarily be provided. Likewise, the second coil C2 is arranged on the second supporter 27 in each of the above embodiments, but the second coil C2 may be arranged at any position on the rotation body 400. For example, the second coil C2 may be arranged on the rotation shaft 24 or the turntable 23. In other words, the second supporter 27 need not necessarily be provided. However, the first coil C1 and the second coil C2 are arranged at a position apart from each other and opposing to each other.

(8) In each of the embodiments described above, the first supporter 26 and the casing 22 constitute the base portion 300. However, the configuration of the base portion 300 is not limited to the above example. For example, the base portion 300 may have a configuration such that the first supporter 26 and the casing 22 are formed as a single body, or may have a configuration that includes elements different from the first supporter 26 and the casing 22. Likewise, in each of the above embodiments the turntable 23, the rotation shaft 24, and the second supporter 27 together constitute the rotation body 400. However, the configuration of the rotation body 400 is not limited thereto. For example, the rotation body 400 may have a configuration such that the turntable 23, the rotation shaft 24, and the second supporter 27 are formed as a single body, or one that includes elements different from the turntable 23, the rotation shaft 24, and the second supporter 27.

(9) In each of the embodiments described above, the first supporter 26 supports the first coil C1. However, a method of supporting the first coil C1 is not limited thereto. For example, the first coil C1 may be supported by use of a plurality of supporters. Similarly, the second coil C2 may be supported by use of a plurality of supporters. As long as the first coil C1 is arranged on the base portion 300 and the second coil C2 is arranged on the rotation body 400, any appropriate method of arranging the first coil C1 and the second coil C2 may be used.

(10) In each of the embodiments described above, a configuration in which the electric circuit 29 includes the manipulation detector 297, the communication device 295, the vibration body 291, and the amplifier 293 is shown. However, the configuration of the electric circuit 29 is not limited to the above example.

(11) In each of the embodiments described above, the audio signal V2 is supplied to the action unit, but an audio signal V2 that has undergone signal processing such as effect imparting processing, for example, to adjust frequency characteristics may be supplied to the action unit.

(12) In each of the embodiments described above, a configuration in which the control system 10 and the DJ device 20 are each provided as a separate device is shown. However, the control system 10 may be mounted on the DJ device 20.

(13) In each of the embodiments described above, a battery for accumulating electric power supplied from the non-contact power feeder C may be provided in a path between the power supply processing circuit 28 and the electric circuit 29.

(14) The following configurations, for example, are derivable from the embodiments illustrated above.

An audio device according to an aspect (a first aspect) of the present disclosure includes a base portion; a power supply circuit arranged on the base portion and configured to output electric power; a rotation body rotatably supported by the base portion and configured to, upon rotation of the rotation body, move a playback point of a piece of music; an electric circuit arranged on the rotation body; and a non-contact power feeding mechanism configured to supply in a non-contact manner the electric power output by the power supply circuit to the electric circuit, and the non-contact power feeding mechanism is arranged on a path from the power supply circuit to the electric circuit. In a configuration in which electric power is supplied to an electric circuit of a rotation body by a wired connection such as by use of power cables, a problem exists in that the power cables disturb rotation of the rotation body. Also assumed is a configuration in which electric power is supplied to an electric circuit of a rotation body by using a commutator and a brush. However, wear of the commutator over time and noise generated by sliding between the commutator and the brush are problematic. According to this aspect, a non-contact power feeding mechanism is arranged on a path from the supply circuit power to the electric circuit, and the electric power output by the power supply circuit arranged on the base portion that supports the rotation body is supplied via the non-contact power feeding mechanism to the electric circuit arranged on the rotation body. Accordingly, electric power can be supplied to the electric circuit on the rotation body without disturbing the rotation thereof, while suppressing wear and noise.

In an example (a second aspect) of the first aspect, the rotation body is configured to rotate in accordance with a manipulation of the rotation body carried out by a user. According to this aspect, since the rotation body rotates in accordance with the manipulation carried out by the user, DJ play such as scratching can be performed.

In an example (a third aspect) of the first aspect or the second aspect, the audio device further includes a drive mechanism configured to rotate the rotation body together with a record placed on the rotation body. According to this aspect, since a record is placed on the rotation body that is rotated by the drive mechanism, sound recorded on the record can be played.

In an example (a fourth aspect) of any one of the first to the third aspects, the non-contact power feeding mechanism includes a transformer that includes a first coil arranged on the base portion and a second coil arranged to be movable with the rotation body. According to this aspect, electric power can be supplied to the electric circuit in a non-contact manner by use of a simple configuration that utilizes mutual induction between the first coil and the second coil.

In an example (a fifth aspect) of any one of the first to the fourth aspects, the electric circuit includes an action unit configured to operate in accordance with an audio signal representative of a musical performance sound of the piece of music. According to this aspect, since the electric circuit includes the action unit that operates in accordance with the audio signal representative of musical performance sounds of the piece of music, a user can sense a piece of music intuitively in ways other than aurally.

In an example (a sixth aspect) of the fifth aspect, the action unit is a vibration body configured to vibrate in accordance with the audio signal. According to this aspect, the action unit is the vibration body that vibrates in accordance with the audio signal. For example, in a configuration where the rotation body rotates in accordance with manipulation carried out by a user, the vibration body serves as a vibration imparter that upon vibration imparts vibration to the user who is in contact with the rotation body. Therefore, a user (i.e., a DJ) in physical contact with the rotation body is able to sense a piece of music tactually.

In an example (a seventh aspect) of the fifth aspect, the action unit is a light emitter configured to emit light in accordance with the audio signal. According to this aspect, since the action unit is the light emitter that emits light in accordance with the audio signal, a user (i.e., a DJ) who manipulates the rotation body is able to sense a piece of music visually.

In an example (an eighth aspect) of any one of the fifth to the seventh aspects, the electric circuit includes a manipulation detector configured to generate manipulation information in accordance with the manipulation of the rotation body carried out by a user, and the audio signal is generated based on the manipulation information. According to this aspect, electric power is supplied in a non-contact manner to the manipulation detector arranged on the rotation body, manipulation information is generated in accordance with manipulation carried out by the user to the rotation body; accordingly, manipulation information according to the manipulation carried out by the user to the rotation body is able to be generated without disturbing the rotation of the rotation body, and wear and noise is suppressed.

In an example (a ninth aspect) of any one of the fifth to the eighth aspects, the electric circuit includes a communication device configured to wirelessly receive the audio signal, and the action unit is configured to operate in accordance with the audio signal received by the communication device. According to this aspect, since the action unit operates in accordance with the audio signal wirelessly received by the communication device, noise in the audio signal can be reduced, as compared with a configuration in which, for example, the non-contact power feeder transmits an audio signal to the action unit.

In an example (a tenth aspect) of any one of the fifth to the ninth aspects, the electric circuit further includes an amplifier configured to amplify the audio signal received by the communication device, and the action unit is configured to operate in accordance with the audio signal amplified by the amplifier. According to this aspect, electric power is supplied in a non-contact manner to the amplifier arranged on the rotation body for amplification of the audio signal received by the communication device, and thus the audio signal supplied to the action unit can be amplified without disturbing the rotation of the rotation body, while suppressing wear and noise.

In an example (an eleventh aspect) of any one of the fifth to the tenth aspects, the non-contact power feeding mechanism is configured to transmit the audio signal from the base portion to the action unit, and the action unit is configured to operate in accordance with the audio signal transmitted from the non-contact power feeding mechanism. According to this aspect, since the action unit operates in accordance with the audio signal transmitted from the non-contact power feeder, a size of the audio device can be reduced, as compared with a configuration in which, for example, an element that transmits an audio signal to the action unit is separately provided from the non-contact power feeder.

DESCRIPTION OF REFERENCE SIGNS

100 . . . playback system, 10 . . . control system, 12 . . . communicator, 13 . . . sound outputter, 14 . . . controller, 141 . . . playback controller, 15 . . . storage device, 212 . . . detection device, 121 . . . record needle, 123 . . . tone arm, 214 . . . communication device, 22 . . . casing, 23 . . . turntable, 24 . . . rotation shaft, 25 . . . power supply circuit, 251 . . . oscillation circuit, 253 . . . alternating-current conversion circuit, 253 . . . conversion circuit, 257 . . . harmonic suppression circuit, 259 . . . DC cut circuit, 26 . . . first supporter, 27 . . . second supporter, 28 . . . power supply processing circuit, 281 . . . DC cut circuit, 283 . . . rectifier circuit, 285 . . . smoothing circuit, 29 . . . electric circuit, 291 . . . vibration body, 293 . . . amplifier, 295 . . . communication device, 297 manipulation detector, 300 . . . base portion, 400 . . . rotation body, 521 . . . rotation body, 522 . . . pulley, 523 . . . motor, 524 . . . endless belt, C . . . non-contact power feeder, C1 . . . first coil, C2 . . . second coil.

What is claimed is:

1. An audio device comprising:
a base portion;
a power supply circuit arranged on the base portion and configured to output electric power;
a rotation body rotatably supported by the base portion and configured to, upon rotation of the rotation body, move a playback point of a piece of music;
an electric circuit arranged on the rotation body; and
a non-contact power feeding mechanism configured to supply in a non-contact manner the electric power output by the power supply circuit to the electric circuit,
wherein the non-contact power feeding mechanism:
is arranged on a path from the power supply circuit to the electric circuit; and
includes a transformer that includes a first coil arranged on the base portion and a second coil arranged to be movable with the rotation body.

2. The audio device according to claim 1, wherein the rotation body is configured to rotate in accordance with a manipulation of the rotation body carried out by a user.

3. The audio device according to claim 1, further comprising a drive mechanism configured to rotate the rotation body together with a record placed on the rotation body.

4. The audio device according to claim 1, wherein the electric circuit includes an action unit configured to operate in accordance with an audio signal representative of a musical performance sound of the piece of music.

5. The audio device according to claim 4, wherein the action unit is a vibration body configured to vibrate in accordance with the audio signal.

6. The audio device according to claim 4, wherein the action unit is a light emitter configured to emit light in accordance with the audio signal.

7. The audio device according to claim 4, wherein:
the electric circuit includes a manipulation detector configured to generate manipulation information in accordance with a manipulation of the rotation body carried out by a user, and
the audio signal is generated based on the manipulation information.

8. The audio device according to claim 4, wherein:
the electric circuit includes a communication device configured to wirelessly receive the audio signal, and
the action unit is configured to operate in accordance with the audio signal received by the communication device.

9. The audio device according to claim 8, wherein:
the electric circuit further includes an amplifier configured to amplify the audio signal received by the communication device, and
the action unit is configured to operate in accordance with the audio signal amplified by the amplifier.

10. The audio device according to claim 4, wherein:
the non-contact power feeding mechanism is configured to transmit the audio signal from the base portion to the action unit, and
the action unit is configured to operate in accordance with the audio signal transmitted from the non-contact power feeding mechanism.

* * * * *